(12) United States Patent
Gong et al.

(10) Patent No.: US 9,072,035 B2
(45) Date of Patent: Jun. 30, 2015

(54) METHOD AND SYSTEM FOR TASK MAPPING BASED ON CORRESPONDING VIRTUAL MODEM IDENTIFIERS IN AN OPERATING SYSTEM FOR VIRTUAL MODEMS WITHIN A MULTI-SIM MULTI-STANDBY COMMUNICATION DEVICE

(75) Inventors: Zhijun Gong, Iselin, NJ (US); Xiaoxin Qiu, Bridgewater, NJ (US); Yuan Liu, Holmdel, NJ (US); Yaxin Cao, Laurence Harbor, NJ (US); Yongqian Wang, East Brunswick, NJ (US); Stephen Richards, Maidenhead (GB)

(73) Assignee: Broadcom Corporation, Irvine, CA (US)

( * ) Notice: Subject to any disclaimer, the term of this patent is extended or adjusted under 35 U.S.C. 154(b) by 345 days.

(21) Appl. No.: 12/821,673

(22) Filed: Jun. 23, 2010

(65) Prior Publication Data

US 2011/0117965 A1 May 19, 2011

Related U.S. Application Data

(60) Provisional application No. 61/261,922, filed on Nov. 17, 2009.

(51) Int. Cl.
*H04B 1/38* (2006.01)
*H04W 48/18* (2009.01)
*H04W 88/06* (2009.01)

(52) U.S. Cl.
CPC .............. *H04W 48/18* (2013.01); *H04W 88/06* (2013.01)

(58) Field of Classification Search
CPC ................. H04W 4/003; H04W 3/304–3/306; H04W 17/103
See application file for complete search history.

(56) References Cited

U.S. PATENT DOCUMENTS

| | | | |
|---|---|---|---|
| 6,012,113 A * | 1/2000 | Tuckner | 710/64 |
| 6,934,551 B1 * | 8/2005 | Kuriyan | 455/466 |
| 7,840,967 B1 * | 11/2010 | Czajkowski et al. | 719/312 |
| 2005/0114448 A1 * | 5/2005 | Skomra | 709/204 |
| 2006/0107174 A1 | 5/2006 | Heise | |
| 2007/0072629 A1 * | 3/2007 | Bae | 455/461 |
| 2007/0168951 A1 * | 7/2007 | Vollmann et al. | 717/118 |
| 2007/0195733 A1 | 8/2007 | Noh | |
| 2007/0217489 A1 | 9/2007 | Bar-El et al. | |
| 2008/0056214 A1 | 3/2008 | Low et al. | |

(Continued)

OTHER PUBLICATIONS

Non-Final Rejection mailed Oct. 31, 2011 for U.S. Appl. No. 12/816,835, filed Jun. 16, 2010; 15 pages.

(Continued)

*Primary Examiner* — Keith Fang
(74) *Attorney, Agent, or Firm* — Sterne, Kessler, Goldstein & Fox P.L.L.C.

(57) ABSTRACT

A multiple-subscriber identity module (multi-SIM) multi-standby communication device includes a single operating system (OS) and a single radio resource unit that is shared by multiple virtual modems (VMs) within a virtual modem framework (VMF). The OS maps VM tasks of the multiple VM to OS resource spaces according to corresponding VM IDs. which may be embedded in global variables utilized in the single OS to access OS resources. The single OS may run the mapped VM tasks utilizing OS resources in the OS resource spaces. The OS may run VM tasks utilizing OS resources in OS resource spaces identified by corresponding VM IDs.

16 Claims, 6 Drawing Sheets

(56) References Cited

U.S. PATENT DOCUMENTS

| | | |
|---|---|---|
| 2008/0062961 A1 | 3/2008 | Nowlan |
| 2008/0161030 A1* | 7/2008 | Pernu .......................... 455/509 |
| 2010/0061431 A1 | 3/2010 | Jyrkka et al. |
| 2010/0327459 A1 | 12/2010 | Yasumori et al. |
| 2011/0117909 A1 | 5/2011 | Cao et al. |
| 2011/0117944 A1 | 5/2011 | Cao et al. |
| 2011/0117962 A1 | 5/2011 | Qiu et al. |
| 2011/0117963 A1 | 5/2011 | Wang et al. |
| 2011/0117964 A1 | 5/2011 | Luo |

OTHER PUBLICATIONS

Final Rejection mailed May 9, 2012 for U.S. Appl. No. 12/816,835, filed Jun. 16, 2010; 14 pages.
Non-Final Rejection mailed Dec. 13, 2011 for U.S. Appl. No. 12/819,014, filed Jun. 18, 2010; 14 pages.
Final Rejection mailed Jun. 15, 2012 for U.S. Appl. No. 12/819,014, filed Jun. 18, 2010; 18 pages.
Non-Final Rejection mailed Feb. 17, 2012 for U.S. Appl. No. 12/901,322, filed Oct. 8, 2010; 14 pages.
Final Rejection mailed Jun. 5, 2012 for U.S. Appl. No. 12/901,322, filed Oct. 8, 2010; 16 pages.
Non-Final Rejection mailed Oct. 31, 2011 for U.S. Appl. No. 12/816,782, filed Jun. 16, 2010; 14 pages.
Final Rejection mailed May 14, 2012 for U.S. Appl. No. 12/816,782, filed Jun. 16, 2010; 17 pages.
Non-Final Rejection mailed Nov. 1, 2012 for U.S. Appl. No. 12/816,782, filed Jun. 16, 2010; 9 pages.

* cited by examiner

METHOD AND SYSTEM FOR TASK MAPPING BASED ON CORRESPONDING VIRTUAL MODEM IDENTIFIERS IN AN OPERATING SYSTEM FOR VIRTUAL MODEMS WITHIN A MULTI-SIM MULTI-STANDBY COMMUNICATION DEVICE

CROSS-REFERENCE TO RELATED APPLICATIONS/INCORPORATION BY REFERENCE

This patent application makes reference to, claims priority to and claims the benefit from U.S. Provisional Patent Application Ser. No. 61/261,922 filed on Nov. 17, 2009.

This application makes reference to:

U.S. application Ser. No. 12/816,782 filed on Jun. 16, 2010,

U.S. application Ser. No. 12/816,835 filed on Jun. 16, 2010,

U.S. application Ser. No. 12/819,014 filed on Jun. 18, 2010, and

U.S. application Ser. No. 12/819,039 filed on Jun. 18, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for task scheduling in an operating system for virtual modems within a multi-SIM multi-standby communication device.

BACKGROUND OF THE INVENTION

With the development of mobile communication systems, mobile devices may utilize various mobile communication techniques such as, for example, global system for mobile communications (GSM), Universal Mobile Telecommunications System (UMTS), Long Term Evolution (LTE) network and wireless local area network (WLAN) to receive desired services. In instances where a mobile device subscribes to a communication network, subscriber information may be required to identify the mobile device to the network for various network services such as authentication, accounting, billing and security services. The subscriber information may be stored in a subscriber identity module (SIM) card inserted in the mobile device. A SIM card is a card or a chip installed in the mobile device providing information to identify the subscriber carrying the mobile device to networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for task scheduling in an operating system for virtual modems within a multi-SIM multi-standby communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for task scheduling in an operating system for virtual modems within a multi-SIM multi-standby communication device. In various embodiments of the invention, a multiple-subscriber identity module (multi-SIM) multi-standby communication device comprises a single radio resource unit providing open system interconnect (OSI) layer one, which is also referred to as the physical layer (PHY), and RF, for example, functionalities. The single radio resource unit is shared by a plurality of virtual modems (VMs) in a virtual modem architecture (VMA). The VMA is deployed over the single radio resource unit to handle operations in a multi-standby mode. The VMA comprises a plurality of virtual modems (VMs), a virtual modem framework (VMF) and a virtual modem controller (VMC). Each VM is uniquely associated with a single one of a plurality of SIM cards that are coupled to the multi-SIM multi-standby communication device. A single operating system (OS) may be installed on the multi-SIM multi-standby communication device to run or execute programs for procedures and/or activities related to VMs in the VMA. The OS may be operable to handle VM tasks associated with corresponding one of the plurality VMs in the VMA. VM tasks of the plurality of VMs may be mapped to specific OS resource spaces of the OS based on corresponding VM IDs. The OS may run each of the mapped VM tasks utilizing OS resources located in the corresponding OS resource spaces. VM ID information may be embedded in global variables and/or static variables that may be utilized in the OS to access the OS resources. An OS resource space for each of the VM tasks may be identified or allocated through its own copy of global and static variables in the OS. The OS may run each of the mapped VM tasks utilizing OS resources located in corresponding OS resource spaces. In instances where VM tasks of different VMs are mapped to a same OS resource space, OS resources located in the same OS resource space may be re-used or re-run for each of the mapped VM tasks, respectively, without duplicating the OS resources. For example, the same OS resource space may be mapped into different physical memory based on corresponding VM ID to ensure legacy software compatible with multiple VMs. In this regard, the legacy software may be utilized over the same OS resource space for the different VMs without interfering with one to another. To arbitrate conflicts in OS resource contention, a task priority may be determined for each of the mapped VM tasks based on corresponding VM environment such as information related to a VM state and/or task context. Resulting VM task scheduling information may be stored and utilized for execution of corresponding ones of the VM tasks, accordingly.

Figure 1:
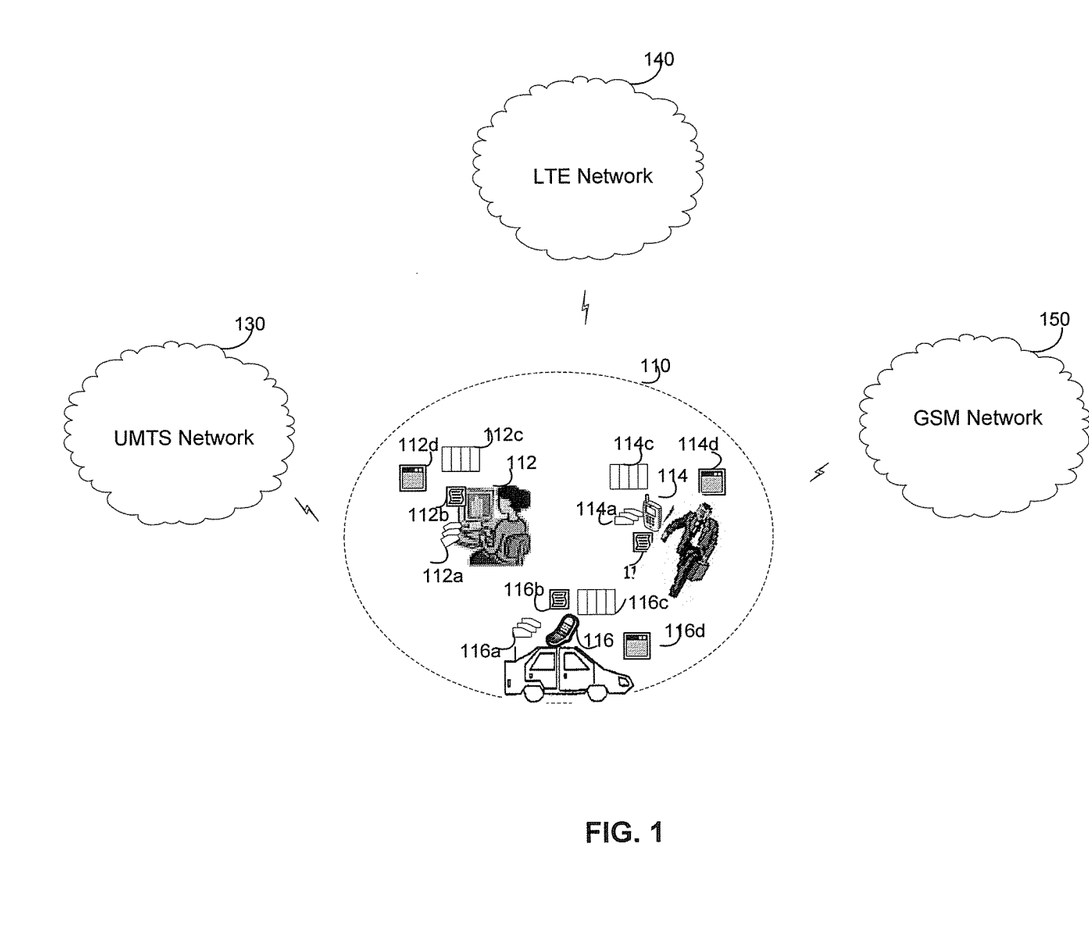
FIG. 1 is a diagram illustrating an exemplary communication system that is operable to schedule virtual modem related tasks for a multi-SIM multi-standby communication device, in accordance with an embodiment of the invention.

FIG. 1 is a diagram illustrating an exemplary communication system that is operable to schedule virtual modem related tasks for a multi-SIM multi-standby communication device, in accordance with an embodiment of the invention. Referring to FIG. 1, there is shown a communication system 100. The communication system 100 comprises a plurality of mobile devices 110, of which multi-SIM multi-standby communication devices 112-116 are illustrated, a UMTS network 130, a Long Term Evolution (LTE) network 140, and a GSM network 150.

A multi-SIM multi-standby communication device such as the multi-SIM multi-standby communication device 112 may comprise suitable logic, circuitry, interfaces and/or code that are operable to communicate or support various network services such as authentication, billing and/or security with a plurality of communication access networks such as, for example, the UMTS network 130, the LTE network 140, and the GSM network 150. Multiple SIM cards such as SIM cards 112a may be inserted in the multi-SIM multi-standby communication device 112 whenever needed. The inserted SIM cards 112a may be coupled or connected with the multi-SIM multi-standby communication device 112 through one or more SIM card sockets or connections. The multi-SIM multi-standby communication device 112 may read or retrieve SIM identification information from the SIM cards 112a via the one or more SIM card sockets or connections. The retrieved SIM identification information may be stored within the multi-SIM multi-standby communication device 112 to support various network services such as authentication, billing and security whenever needed. In this regard, the multi-SIM multi-standby communication device 112 may be configured to activate the retrieved SIM identification information either on one SIM card at a time or on multiple SIM cards at the same time depending on implementation and/or device configuration. In instances where the retrieved SIM identification information is activated on one SIM card at a time, the multi-SIM multi-standby communication device 112 may operate in a single-standby mode. In instances where the retrieved SIM identification information is activated on two or more SIM cards at the same time, the multi-SIM multi-standby communication device 112 may operate in a multi-standby mode. In this regard, the multi-SIM multi-standby communication device 112 in a multi-standby mode may be operable to support multiple subscriptions at the same time. A user of the multi-SIM multi-standby communication device 112 may be allowed to utilize multiple numbers, multiple different service plans and/or one or more network carriers at the same time whenever the multi-SIM multi-standby communication device 112 is in a multi-standby mode.

U.S. application Ser. No. 12/816,782, which is filed on Jun. 16, 2010, provides detailed descriptions that a Virtual Modem Architecture (VMA) may be adopted over a single radio resource unit to support a multi-standby mode on a multi-SIM multi-standby communication device, and is hereby incorporated herein by reference in its entirety. A single radio resource unit may comprise suitable logic, circuitry, interfaces and/or code that are operable to provide PHY and RF functionalities to support desired services on a communication device. For example, the single radio resource units 112c-116c may be integrated into the multi-SIM multi-standby communication devices 112-116, respectively, for PHY and RF support.

A multi-SIM multi-standby communication device such as the multi-SIM multi-standby communication device 112 may be configured to concurrently handle multiple tasks or instances deployed on the single radio resource unit 112c. Each task or instance is associated with one of the multiple SIM cards 112a. A task may also be called an instance of a process. An air interface protocol stack and/or a Common Application Programming Interface (CAPI) module may comprise multiple tasks. A collection of air interface protocol stack tasks and/or CAPI tasks associated with a single SIM card together with appropriate physical layer (PHY), DSP functionalities, and/or RF functionalities supported by the single radio resource unit 112c is referred to as a Virtual Modem (VM). Each VM in the VMA 112b may be assigned to handle instances related to one of the multiple SIM cards 112a. A VM may be in one of a plurality of VM states, comprising, for example, an active state, an idle state or a suspended state. In the active state, radio resources are assigned to the VM and a valid connection between a VM and an associated cell is established for data and/or voice communication. The VM may be allowed to utilize radio resources available in the radio resource unit 112c to communicate services related to a specific SIM card. In the idle state, no valid or active connection between the VM and an associated cell is established; however, associated registration information is retained in the associated cell. In the idle state, the VM may be allowed to utilize limited radio resources available in the single radio resource unit 112c to monitor paging events and to perform normal idle mode activities such as cell selection/reselection. In the suspended state, a VM may be suspended from using radio resources available in the single radio resource unit 112c. Before entering the suspended state, the VM may need to suspend or abort procedures such as, for example, data transfer, operating band change and/or manual public land mobile network (PLMN) search, which are currently being executed on the VM.

Radio resources available in the single radio resource unit 112c may be shared by multiple VMs in the VMA 112b. In order to arbitrate or resolve contention for available radio resources in the single radio resource unit 112c, the VMA 112b may be operable to manage or control the VMs to transition among one or more of a plurality of VM states and/or coordinate procedures or activities initiated by multiple VMs, which may be running on a single operating system (OS) installed on the multi-SIM multi-standby communication device 112. An OS is referred to as a software platform on top of which other programs run. For example, each of the OSs 112d-116d may be installed on one of the multi-SIM multi-standby communication devices 112-116, respectively, to run programs for procedures or activities related to one or more VMs.

In various exemplary embodiments of the invention, the OS 112*d* may be operable to run programs to handle VM related tasks, hereinafter called VM tasks, associated with procedures or activities related to multiple VMs in the VMA 112*b*. The OS 112*d* may be configured to coordinate and/or optimize the usage of OS resources for VM tasks of multiple VMs in the VMA 112*b*. The OS resources may comprise OS codes and OS data, which may be stored in a device physical memory (random access memory (RAM)). The OS resources in the device physical memory may be indexed via pointers or memory addresses, and may be shared by VM tasks for corresponding ones of the plurality of VMs on the multi-SIM multi-standby communication device 112. However, global variables and/or static variables that are utilized to access the OS resources in the device physical memory may be maintained inside each individual VM task. In this regard, VM identifiers (IDs) may be embedded in global and static variables that are utilized to access to the OS resources in the device physical memory. Each of the VM tasks may then have access to the OS resources in the device physical memory through its own copy of global and static variables. A memory address or a pointer for each of the VM tasks may be calculated or determined based on a corresponding VM ID. VM tasks associated with different VMs may be transparently mapped to OS resource spaces that are spaces in the device physical memory and are indexed by the corresponding determined memory addresses. An OS resource space may comprise a code space and a data space. The OS 112*d* may be operable to run or execute the VM tasks utilizing OS resources located in corresponding OS resource spaces, which may be indicated by corresponding VM IDs.

In various exemplary embodiments of the invention, the OS 112*d* may be operable to share OS resources in the device physical memory among VM tasks of different VMs without duplicating the OS resource. For example, in instances where VM tasks of different VMs are mapped to a same OS resource space in the device physical memory, OS resources located in the same OS resource space may be re-used or re-run for each of the VM tasks, respectively, based on corresponding copies of global and static variables for each of the VM tasks. More specifically, the same OS resource space may be mapped into different physical memory based on corresponding VM ID to ensure legacy software compatible with multiple VMs. In this regard, the legacy software may be utilized over the same OS resource space for the different VMs without interfering with one to another.

In various exemplary embodiments of the invention, the OS 112*d* may be operable to arbitrate or resolve contention for the OS resources via VM task scheduling. In this regard, a task priority may be determined by the OS 112*d* for each of the VM tasks based on a corresponding VM environment such as a VM state and/or task context. For example, a VM task for a VM in an active state may be assigned a higher priority than a VM task for a VM in an idle state. In another example, a VM task for a paging message may have a higher priority than a VM task for a cell broadcasting message. The OS 112*d* may be operable to schedule VM tasks of multiple VMs based on corresponding task priorities.

The UMTS network 130 may comprise suitable devices, circuitry, interfaces and/or code that are operable to provide and/or voice services to various UMTS capable communication devices such as the multi-SIM multi-standby communication device 112 using UMTS technology. In this regard, the UMTS network 130 may be operable to authenticate users such as the multi-SIM multi-standby communication devices 112-116 for UMTS access utilizing SIM cards. A SIM card for UMTS is also known as universal subscribe identity module (USIM). Only authorized users may access the UMTS network 130. The UMTS network 130 may be operable to check the validity of USIM identification information on one or more USIM cards coupled to, for example, the multi-SIM multi-standby communication device 112. The UMTS network 130 may determine whether the multi-standby communication device 112 is allowed to access the UMTS network 130 for various network services such as, for example, authentication, accounting and/or billing services.

The LTE network 140 may comprise suitable devices, circuitry, interfaces and/or code that are operable to provide and/or voice services to various LTE capable communication devices such as the multi-SIM multi-standby communication device 112 using LTE technology. In this regard, the LTE network 140 may be operable to authenticate users such as the multi-SIM multi-standby communication devices 112-116 for LTE access utilizing SIM cards. A SIM card for LTE is also known as Universal Integrated Circuit Card (UICC). Only authorized users may access the LTE network 140. The LTE network 140 may be operable to check the validity of UICC identification information on one or more UICCs coupled to, for example, the multi-SIM multi-standby communication device 112. The LTE network 140 may determine whether the multi-SIM multi-standby communication device 112 is allowed to access the LTE network 140 for various network services such as, for example, authentication, accounting and/or billing services.

The GSM network 150 may comprise suitable devices, circuitry, interfaces and/or code that are operable to provide and/or voice services to various GSM capable communication devices such as the multi-SIM multi-standby communication device 112 using GSM technology. In this regard, the GSM network 150 may be operable to authenticate users such as the multi-SIM multi-standby communication devices 112-116 for GSM access utilizing SIM cards. Only authorized users may access the GSM network 150. The GSM network 150 may be operable to check the validity of SIM identification information on one or more SIM cards coupled to, for example, the multi-SIM multi-standby communication device 112. The GSM network 150 may determine whether the multi-SIM multi-standby communication device 112 is allowed to access the GSM network 150 for various network services such as, for example, authentication, accounting and/or billing services.

In an exemplary operation, a multi-SIM multi-standby communication device such as the multi-SIM multi-standby communication device 112 may be connected or coupled with multiple SIM cards such as the SIM cards 112*a* through one or more SIM card sockets or connections. SIM identification information on each of the multiple SIM cards 112*a* may be communicated to the multi-SIM multi-standby communication device 112 through the one or more SIM card sockets. The multi-SIM multi-standby communication device 112 may operate in a single-standby mode or a multi-standby mode depending on device configuration and/or user preferences. A user of the multi-SIM multi-standby communication device 112 in a multi-standby mode may be allowed to utilize SIM identification information associated with each of the multiple SIM cards 112*a* to receive corresponding services at the same time. In this regard, the multi-SIM multi-standby communication device 112 may be operable to deploy the VMA 112*b* over the single radio resource unit 112*c* to support operations involved in a multi-standby mode. Each VM in the VMA 112*b* may be assigned to or associated with one of the multiple SIM cards 112*a*. Each of the VM tasks may be transparently mapped to a specific OS resource space for OS resources based on a corresponding VM ID. OS resources in the OS 112d may be shared by VM tasks of different VMs without duplication. In this regard, the same OS resource space required for access by different VMs may be mapped into different physical memory based on corresponding VM ID to ensure legacy software compatible with each of the different VMs. In other words, the legacy software may be utilized over the same OS resource space for the different VMs without interfering with one to another. A task priority may be calculated or determined for each of the VM tasks based on related VM environment so as to arbitrate or resolve contention for the OS resources. VM tasks may be executed or run on the OS 112d based on corresponding task priorities.

Figure 2:
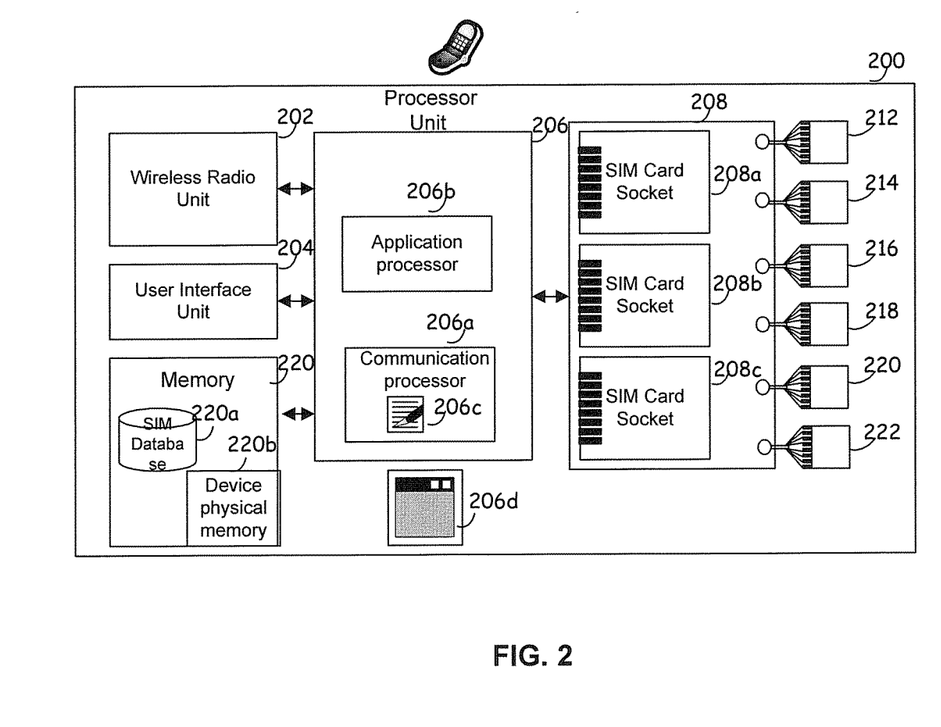
FIG. 2 is a block diagram illustrating an exemplary multi-SIM multi-standby communication device that utilizes a virtual modem framework to support multi-standby operation, in accordance with an embodiment of the invention.

FIG. 2 is a block diagram illustrating an exemplary multi-SIM multi-standby communication device that utilizes a virtual modem framework to support multi-standby operation, in accordance with an embodiment of the invention. Referring to FIG. 2, there is shown a multi-SIM multi-standby communication device 200. The multi-SIM multi-standby communication device 200 comprises a wireless radio unit 202, a user interface unit 204, a processor unit 206, a SIM card controller 208 comprising SIM card sockets 208a-208c, a plurality of SIM cards, of which SIM cards 212-222 are illustrated, an operating system (OS) 214, and a memory 220. The SIM cards 212-222 are coupled to the multi-SIM multi-standby communication device through the SIM card sockets 208a-208c. The memory 220 comprises a SIM database 220a and a device physical memory 220b.

The wireless radio unit 202 may comprise suitable logic, circuitry, interfaces and/or code that may be operable to communicate radio frequency signals with various communication networks such as, for example, the LTE network 140 and the GSM network 150. SIM identification information that is retrieved from one or more of the SIM cards 222-228 may be communicated via the wireless radio unit 202 to identify the multi-SIM multi-standby communication device 200 to network for desired network services such as accounting/billing services.

The user interface unit 204 may comprise suitable logic, circuitry, interfaces and/or code that may enable a user to interact with the multi-SIM multi-standby communication device 200. For example, the user interface unit 204 may be operable to present the user with information on SIM cards available to the multi-SIM multi-standby communication device 200. The user interface unit 204 may allow the user to enter a preferred SIM card selection and/or a desired application selection.

The processor unit 206 may comprise suitable logic, circuitry, interfaces and/or code that may be operable to manage and/or control operations of device components such as, for example, the wireless radio unit 202, the user interface unit 204, the SIM database 220a, and/or the SIM card controller 208. For example, the processor unit 206 may be operable to coordinate and/or control operations of the SIM card controller 208 in response to a SIM card selection from the user interface unit 204. The processor unit 206 may also be operable to utilize a single OS such as the OS 206d to run programs related to a specific application via the application processor based on an application selection from the user interface unit 204.

The processor unit 206 may be operable to select one or more SIM cards based on user preferences and/or device configuration. The processor unit 206 may communicate the SIM card selection information to the SIM card controller 208 so that the selected one or more SIM cards may be connected to the SIM card sockets 208a-208c and thereby to the processor unit 206. The selected SIM cards may be actively connected to the SIM card controller 208 to enable downloading of corresponding SIM identification information into the SIM database 220a of the multi-SIM multi-standby communication device 200. Notwithstanding, in accordance with various embodiments of the invention, after SIM identification information is downloaded from each of the selected SIM cards such as the SIM cards 212-222 into the SIM database 220a of the multi-SIM multi-standby communication device 200, the SIM identification information corresponding to one or more of the plurality of SIM cards may be in an active state or in a standby state in the SIM database 220a. More specifically, at a given time instant, SIM identification information actually being utilized or applied to access corresponding services by the multi-SIM multi-standby communication device 200 is in an active state, otherwise, in a standby state.

In instances where the multi-SIM multi-standby communication device 200 is configured to operate in a single-standby mode, the processor unit 206 may communicate with the SIM database 220a to activate the stored SIM identification information related to one SIM card at a time. In other words, the multi-SIM multi-standby communication device 200, in a single-standby mode, may be operable to utilize SIM identification information activated for a single SIM card at a time. In instances where the multi-SIM multi-standby communication device 200 is configured to operate in a multi-standby mode, the processor unit 206 may be operable to communicate with the SIM database 220a to activate the stored SIM identification information corresponding to multiple SIM cards such as the SIM cards 212-222 at the same time. Specifically, the multi-SIM multi-standby communication device 200, in a multi-standby mode, may be operable to utilize SIM identification information activated for multiple SIM cards at the same time. In this regard, the processor unit 206 may be operable to allow a user of the multi-SIM multi-standby communication device 200 to utilize SIM identification information associated with each of the SIM cards 212-222 to receive corresponding services at the same time. For example, the user may therefore be allowed to utilize multiple numbers, multiple different service plans and/or network carriers associated with each of the multiple SIM cards 212-222 at the same time on the multi-SIM multi-standby communication device 200. The processor unit 206 comprises a communication processor 206a and an application processor 206b.

The communication processor 206a may comprise suitable logic, circuitry, interfaces and/or code that may be operable to utilize a VMA 206c over single radio resource unit such as the single radio resource unit 112c associated with the wireless radio unit 202 to support a multi-standby mode. The VMA 206c is a multi-SIM multi-standby platform and comprises a virtual modem controller (VMC) and a plurality of VMs. Each VM in the VMA 206c is assigned or related to one of the multiple SIM cards 212-222. For a given time instant, a VM may operate in one of in one of a plurality of VM states, namely, an active state, an idle state or a suspended state. To avoid radio resource conflicts, at most one of the VMs in the VMA 206c may be in the active state to transmit and/or receive traffic related to a corresponding SIM card. One or more VMs may be in the suspended state at the same time. One or more VMs may be in the idle state at the same time depending on radio resources available in the single radio resource unit 112c for sharing. Radio resources available in the single radio resource unit 112c may be shared among the VMs. In this regard, the VMA 206c may enable concurrently monitoring paging events related to each of related SIM cards. For example, VMs may receive a paging advertisement message from an associated cell to check incoming traffic.

Upon detection of an intended traffic related to a specific SIM card such as the SIM card 212, which is to be handled by a VM, the VMA 206c may perform a procedural conflict check and/or a radio resource conflict check on other VMs to determine whether there are any conflicts. In instances where there may be one or more conflicts, the VMA 206c may be operable to arbitrate the conflicts and provide a resolution.

In instances where services and/or procedures associated with one or more of the SIM cards 214-222 are in progress, the VMA 206c may suspend the one or more VMs to ensure an uninterrupted radio resource usage by the VM related to the SIM card 212. Once radio resources become available in the single radio resource unit 112c for sharing by the suspended VMs, the VMA 206c may resume the suspended VMs so as to continue normal idle mode activities and/or tasks such as, for example, paging reception/decoding, serving cell measurements and/or neighbor cell measurements. In this regard, the VMA 206c may be operable to concurrently monitor paging events to check incoming traffic, and concurrently perform idle mode procedures such as cell selection/reselection based on radio resources available in the single radio resource unit 112c.

In instances where no services and/or procedures associated with each of the SIM cards 214-222 is in progress, the VMA 206c may transition the VM related to the SIM card 212 from an idle state to an active state to transmit and/or receive the detected intended traffic related to the SIM card 212. The communication processor 206a may communicate the traffic related to the SIM card 212 to the application processor 206b to support desired applications.

The application processor 206b may comprise suitable logic, circuitry, interfaces and/or code that may be operable to run various applications such as video and/or audio multimedia applications based on traffic received by the communication processor 206a. The application processor 206b may present applications to users through the user interface unit 204.

The SIM card controller 208 may comprise suitable logic, circuitry, interfaces and/or code that may be operable to manage and/or control connections from multiple SIM cards such as the SIM cards 212-222 to the SIM card sockets 208a-208c, which are directly coupled with the processor unit 206. In this regard, the SIM card controller 208 may be operable to establish connections between the SIM cards 212-222 and the processor unit 206. The SIM card controller 208 may be configured to switch SIM card connection from one to another as needed without re-booting the multi-SIM multi-standby communication device 200.

A SIM card such as the SIM card 214 may comprise suitable logic, circuitry, interfaces and/or code that may be operable to store subscriber personal identification information such as, for example, operator network, phone number, activated services, billing, and credit information. The SIM card 214 may also store the user's identity for gaining access to the network and receiving calls, and user's personal information such as phone directory and received SMS messages. The SIM card 214 may be implemented as a small printed circuit board. The SIM card 214 may be inserted in a mobile device such as the multi-SIM multi-standby communication device 200 in order for the multi-SIM multi-standby communication device 200 to properly access a corresponding network. The SIM card 214 may be connected to the multi-SIM multi-standby communication device 200 via the SIM card controller 208.

The OS 206d may comprise suitable logic, circuitry, interfaces and/or code that may be operable to run software programs for applications, procedures, and/or activities on the multi-SIM multi-standby communication device 200. In various exemplary embodiments of the invention, the OS 206d may be operable to handle VM tasks of multiple VMs in the VMA 206c. Specifically, the OS 206d may manage or coordinate the usage of OS resources such as OS codes and OS data to support multiple VM tasks of different VMs in the VMA 206c. The OS resources may be stored in the device physical memory 220b for sharing by multiple VMs. Global variables and/or static variables that are utilized in the OS 206d to access the OS resources in the device physical memory 220b may be maintained inside each individual VM task. VM identifier (ID) information associated with each of the VM tasks may be embedded in global and static variables that are utilized to access the OS resources. A VM task may have its own copy of global and static variables to access the OS resources in the device physical memory 220b. A VM task may be mapped to a specific OS resource space in the device physical memory 220b according to a corresponding VM ID. The OS 206d may run or execute programs for each of the VM tasks utilizing OS resources located in an OS resource space indicated by a corresponding VM ID.

In various exemplary embodiments of the invention, VM tasks of different VMs may share OS resources located in a same OS resource space in the device physical memory 220b without duplicating the corresponding OS resources. For example, in instances where VM tasks of different VMs in the VMA 206c are mapped to the same OS resource space in the device physical memory 220b, OS resources located in the same OS resource space may be re-used or re-run for each of the VM tasks of different VMs, respectively. In this regard, the same OS resource space may be mapped into different physical memory based on corresponding VM ID to ensure legacy software compatible with each of the different VMs. The legacy software may be utilized over the same OS resource space for the different VMs without interfering with one to another.

To arbitrate or avoid conflicts in OS resource contention, the OS 206d may be operable to perform VM task scheduling based on VM task priorities. In this regard, a task priority may be determined for each of the VM tasks based on an associated VM environment, which may comprise information such as a VM state and/or task context on an associated VM. For example, the OS 206d may assign a higher task priority on a VM task associated with a VM in an active state than on a VM task associated with a VM in an idle state. A VM task related to a paging message may have a higher priority than a VM task related to a cell broadcasting message.

The memory 220 may comprise suitable logic, circuitry, interfaces and/or code that may be operable to store information such as executable instructions and data that may be utilized by the processor unit 206 and/or other device components such as, for example, the SIM database 220a. The SIM database 220a may comprise suitable logic, circuitry, interfaces and/or code that may be operable to record and/or store SIM identification information retrieved from one or more SIM cards such as the SIM cards 212-222. The stored SIM identification information may be in an active state or in a standby state within the SIM database 220a. For a given time instant, only SIM identification information in an active state may be actually utilized or applied by the multi-SIM multi-standby communication device 200 to support desired network services such as accounting/billing services. Depending on device configuration, for a given time instant, SIM identification information in an active state may correspond to one or more SIM cards. The device physical memory 220b may comprise suitable logic, circuitry, interfaces and/or code that may be operable to record and/or store OS resources such as OS codes and OS data that are utilized to execute or run software programs related to VM tasks of multiple VMs in the VMF 206c. The memory 220 may comprise RAM, ROM, low latency nonvolatile memory such as flash memory and/or other suitable electronic data storage.

In an exemplary operation, a multi-SIM multi-standby communication device such as the multi-SIM multi-standby communication device 200 may be connected or coupled to multiple SIM cards such as the SIM cards 212-222 through the SIM card controller 208. The processor unit 206 may be operable to retrieve SIM identification information from the SIM cards 212-222. The retrieved SIM identification information may be stored in the SIM database 220a. In instances where the multi-SIM multi-standby communication device 200 is configured to operate in a multi-standby mode, the communication processor 206a may communicate with the SIM database 220a to activate the stored SIM identification information corresponding to multiple SIM cards such as the SIM cards 212-222 at the same time. More specifically, the multi-SIM multi-standby communication device 200, in a multi-standby mode, may utilize SIM identification information activated for the SIM cards 212-222 at the same time. A user of the multi-SIM multi-standby communication device 200 may therefore be allowed to receive services related to the SIM cards 212-222 at the same time. The communication processor 206a may run the VMA 206c over the single radio resource unit 112c to handle traffic through the wireless radio unit 202. Each of VM tasks of multiple VMs in the VMA 206c may be executed or run over the OS 206d. The OS resources such as OS codes and OS data stored in the device physical memory 220b may be shared by the VM tasks of multiple VMs in the VMA 206c. The VM ID and/or the VM ID related information may be embedded in global variables and/or static variables that are utilized in the OS 206d to access the OS resources in the device physical memory 220b. In this regard, each of the VM tasks may utilize its own VM ID specific global and static variables in the OS 206d to access the OS resources in the device physical memory 220b. The OS 206d may execute or run each of the VM tasks utilizing OS resources in a specific OS resource space indicated by a corresponding VM ID. In instances where VM tasks of different VMs are mapped to the same OS resource space in the device physical memory 220b, the OS 206d may run each of the VM tasks utilizing OS resources located in the same OS resource space in the device physical memory 220b. To arbitrate or resolve contention for the OS resources, the OS 206d may be operable to perform VM task scheduling based on task priorities. A task priority for a specific VM task may be determined based on an associated VM environment such as a VM stat and related VM context.

Figure 3:
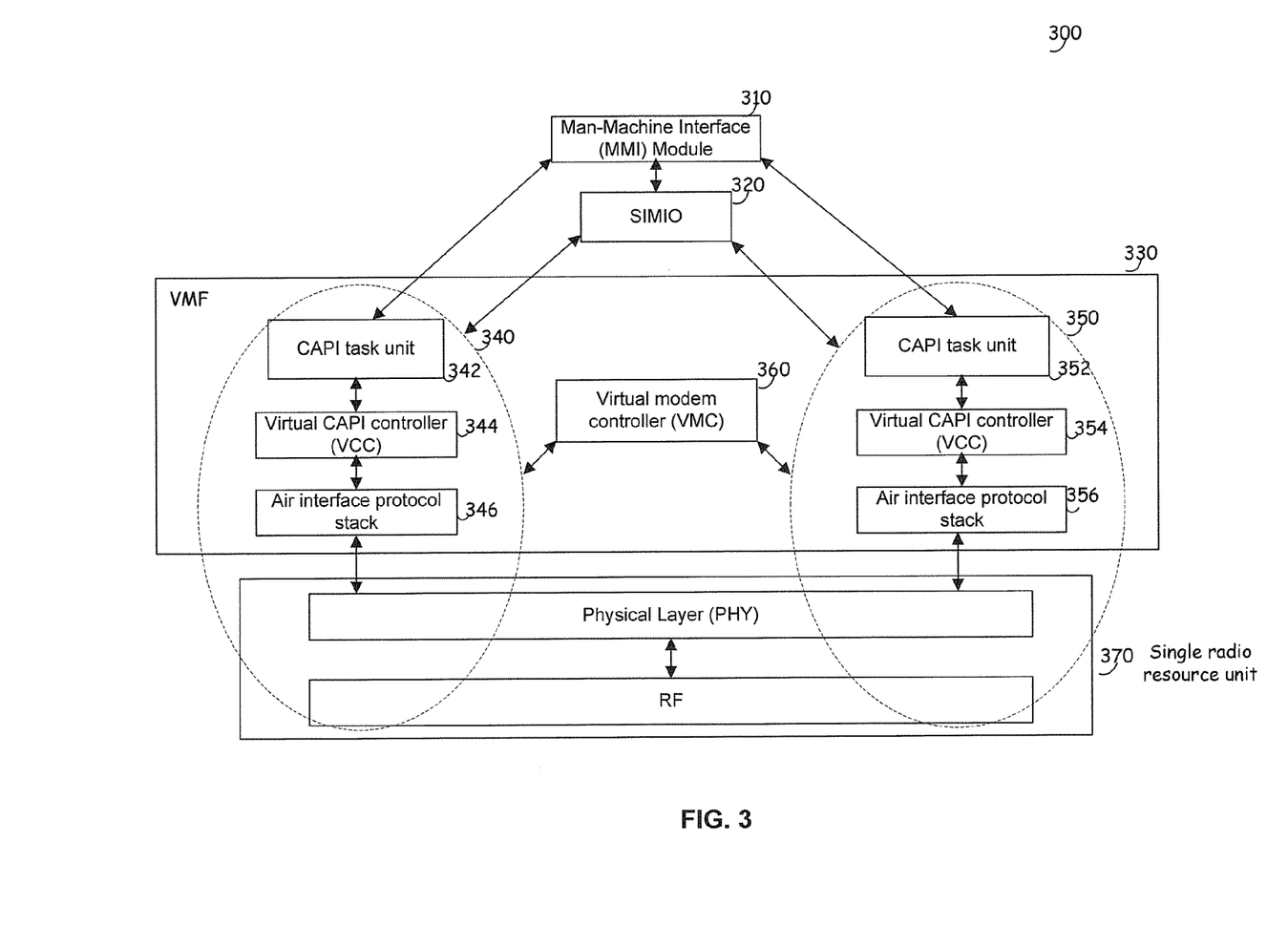
FIG. 3 is a block diagram illustrating an exemplary multi-instance virtual modem approach to concurrently handle multi-instance tasks on a multi-SIM multi-standby communication device, in accordance with an embodiment of the invention.

FIG. 3 is a block diagram illustrating an exemplary multi-instance virtual modem approach to concurrently handle multi-instance tasks on a multi-SIM multi-standby communication device, in accordance with an embodiment of the invention. Referring to FIG. 3, there is shown virtual modem architecture 300 utilized on the multi-SIM multi-standby communication device 200, for example. The virtual modem architecture 300 comprises man-machine interface (MMI) module 310, a SIMIO module 320, a virtual modem framework (VMF) 330, a virtual modem controller (VMC) 360, and a single radio resource unit 370.

The MMI module 310 may comprise suitable logic, interfaces and/or code that may be operable to provide interaction between a user of the multi-SIM multi-standby communication device 200 and one or more applications that are executed on the multi-SIM multi-standby communication device 200.

The SIMIO module 320 may comprise suitable logic, interfaces and/or code that may be operable to manage access to SIM cards such as the SIM cards 212-222.

The VMF 330 may comprise suitable logic, interfaces and/or code that may be operable to provide an enhancement to the Real Time Operating System. The VMF 330 may be deployed or implemented on the communications processor 206a.

A VM such as the VM 340 refers to an instance of an air interface protocol stack and/or its interface to the user, namely, a Common Application Programming Interface (CAPI), together with a single set of radio resources such as radio resources available in the single radio resource unit 370. A VM such as the VM 340 may comprise suitable logic, interfaces and/or code that may be operable to handle instances, namely, CAPI tasks and/or air interface protocol stack instances, associated with one of the SIM cards 212-222. Different VMs such as the VM 340 and the VM 350 may be configured to handle instances corresponding to two different SIM cards. For example, the VM 340 may handle instances related to the SIM card 212, while the VM 350 may be assigned to handle instances related to the SIM card 214. The plurality of VMs such as VMs 340-350 may be configured to share the same set of radio resources, namely, available radio resources in the single radio resource unit 370. In this regard, multiple copies of global and static data may be maintained to be utilized by the VMs 340-350, respectively. A VM such as the VM 340 may operate independently from other VMs and may be in one of the plurality of VM states, namely, an active state, an idle state and a suspended state. The VM 340 may comprise a CAPI task unit 342, a VCC 344, an air interface protocol stack 346 together with the single radio resource unit 370. CAPI and/or stack operations within the VM 340 may be managed via the VCC 344.

The CAPI task unit 342 may comprise suitable logic, interfaces and/or code that may be operable to process MMI or user requests. The CAPI task unit 342 comprises CAPI tasks related to a specific SIM card such as the SIM card 212.

A VCC such as the VCC 344 may comprise suitable logic, interfaces and/or code that may be operable to perform admission control with the VMC 360 for the CAPI module 315 at the primitive levels. The VCC 344 is a dual-instance module for managing its own task or instance, and queuing messages. The VCC 344 may be operable to interact with the VMC 360 for radio resource requests associated with CAPI tasks in the CAPI task unit 342. The VCC 344 may communicate with the air interface protocol stack 346 to coordinate stack operations corresponding to the CAPI tasks in the CAPI task unit 342.

An air interface protocol stack such as the air interface protocol stack 346 may comprise suitable logic, interfaces and/or code that may be operable to provide air interface protocols to support various signaling operations. For example, in 3GPP standard, the stack 346 may comprise Non-Access-Stratum (NAS) protocols and Access-Stratum (AS) protocols to handle bearer level signaling and Radio Resource Control (RRC) signaling, respectively.

The VMC 360 may comprise suitable logic, interfaces and/or code that may be operable to coordinate requests for the usage of radio resources available in the single radio resource unit 370 among multiple associated VMs such as the VM 340 and the VM 350. In this regard, the VMC 360 may be operable to resolve contention for radio resources by transitioning the VM 340 and the VM 350 between the three VM states. For example, the VMC 360 may be operable to ensure that at most one of the VM 340 and the VM 350 is in the active state for a given time instant. In this regard, the VMC 360 may suspend, for example, the VM 350 from using or sharing radio resources available in the single radio resource unit 370 in order to allow an uninterrupted radio resource usage by the VM 340. The suspended VM 350 may be resumed whenever radio resources in the single radio resource unit 370 become available for sharing by the VM 350 to continue idle mode activities on the VM 350.

The VMC 360 may be operable to coordinate the usage of the radio resources to support concurrent procedures initiated by the VM 340 and the VM 350. For example, the VM 340 and the VM 350 each may be granted by the VMC 360 a portion of radio resources available in the single radio resource unit 370 to concurrently monitor paging events and/or to concurrently perform idle mode procedures or activities such as, for example, cell selection/reselection by sharing the single radio resource unit 370.

The single radio resource unit 370 may comprise suitable logic, interfaces and/or code that may be operable to provide PHY and RF support.

In an exemplary operation, the MMI module 310 may interact between a user of the multi-SIM multi-standby communication device 200 and applications that are related to the SIM card 212 and the SIM card 214, for example, inserted into the SIM card controller 208. Tasks or instances related to the SIM card 212 and the SIM card 214 may be handled by the VM 340 and the VM 350, respectively. The VMC 360 may coordinate the usage of radio resources available in the single radio resource unit 370 for sharing by the VM 340 and the VM 350. For a given time instant, at most one of the VM 340 and the VM 350 may be allowed to use the single radio resource unit 370. In other words, for a given time instant, at most one of the VM 340 and the VM 350 may operate in an active state to transmit and/or receive traffic related to a corresponding SIM card. The VM 340 and/or the VM 350 may be in an idle state whenever there is no intended traffic for corresponding SIM cards detected. In an idle state, the VM 340 and the VM 350 may be operable to concurrently perform paging monitoring and/or idle mode procedures such as cell reselecting by sharing radio resources available in the single radio resource unit 370. For example, a VM such as the VM 340 in the idle state may be operable to check or detect an incoming traffic related to the SIM card 212 based on received paging messages. Upon detection of an intended traffic related to the SIM card 212, the VM 340 may remain in the idle state if traffic related to other SIM cards such as the SIM card 214 is still being handled. Otherwise, the VMC 360 may transition the VM 340 from the idle state to an active state in order to transmit and/or receive the detected traffic related to the SIM card 212.

Figure 4:
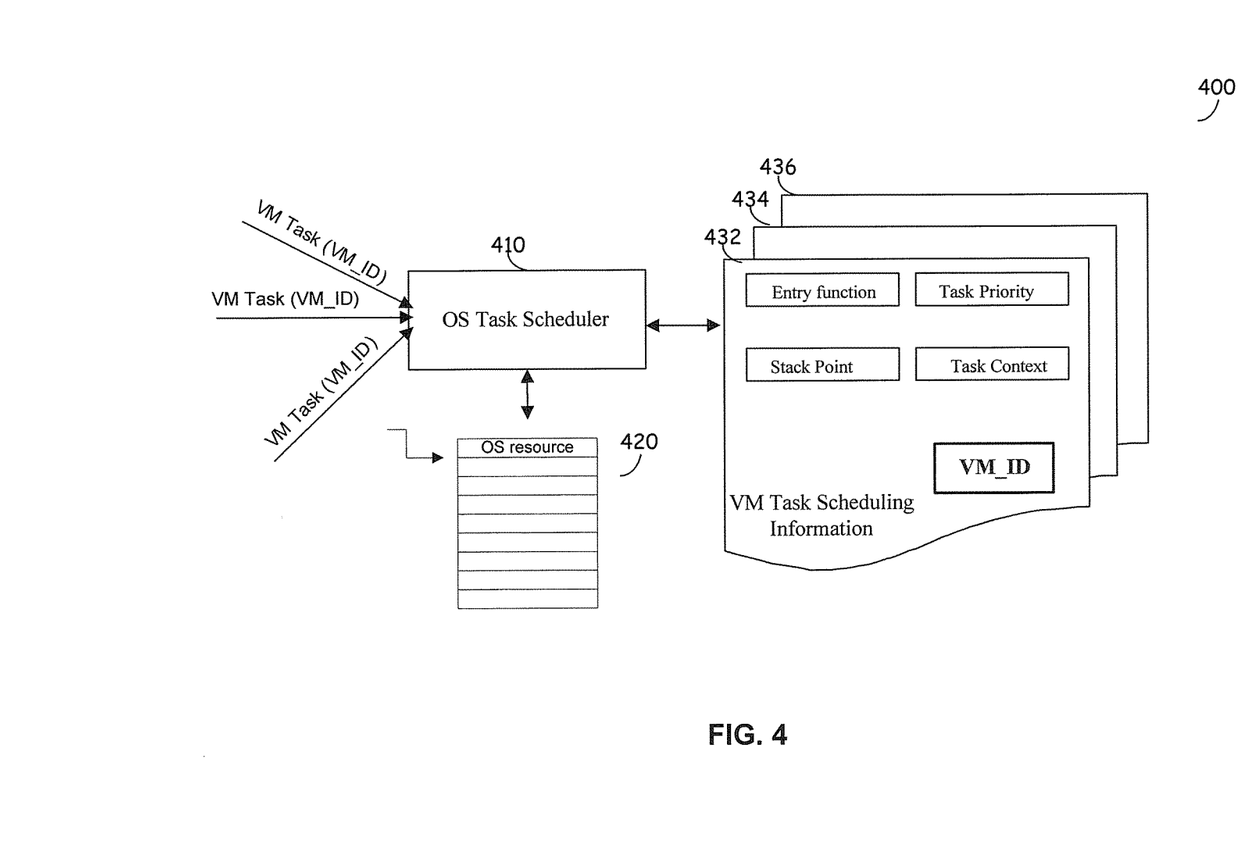
FIG. 4 is a block diagram illustrating an exemplary operating system scheduler that is operable to manage operating system resources to handle virtual modem related tasks for a multi-SIM multi-standby communication device, in accordance with an embodiment of the invention.

FIG. 4 is a block diagram illustrating an exemplary operating system scheduler that is operable to manage operating system resources to handle virtual modem related tasks for a multi-SIM multi-standby communication device, in accordance with an embodiment of the invention. Referring to FIG. 4, there is shown an OS task scheduling system 400. The OS task scheduling system 400 comprises an OS task scheduler 410 and a device physical memory 420.

The OS task scheduler 410 may comprise suitable logic, interfaces and/or code that may be operable to schedule VM tasks for each related VM such as the VM 340 and the VM 350 in the VMF 330. The OS task scheduler 410 may be operable to manage the usage of OS resources such as OS codes and OS data stored in the device physical memory 420 to run VM tasks of VM 340 and the VM 350. The OS task scheduler 410 may be operable to embed VM ID information in global variables and/or static variables that may be utilized to access the OS resources in the device physical memory 420. In this regard, the OS task scheduler 410 may be operable to map VM tasks to specific OS resource spaces of the device physical memory 220b based on corresponding VM IDs.

The OS 206d may run VM tasks utilizing OS resources located in the OS resource spaces indicated by corresponding VM IDs. In instances where one or more VM tasks of different VMs are mapped to a same OS resource space in the device physical memory 420, the OS resources located in the same OS resource space may be re-used to run each of the VM tasks of different VMs without duplicating the OS resources. More specifically, the OS 206d may map the same OS resource space into different physical memory based on corresponding VM ID to ensure legacy software compatible with multiple VMs. In this regard, the OS 206d may be operable to utilize the legacy software over the same OS resource space for the different VMs without interfering with one to another.

In order to arbitrate or resolve conflicts in OS resource contention, the OS task scheduler 410 may be operable to perform VM task scheduling based on VM task priorities. A task priority of a VM task may be determined based on an associated VM environment such as a VM state and/or task context. Resulting VM task scheduling information 432-436 may be stored in the memory 220, for example, for each of the VM tasks. The stored VM task scheduling information may comprise VM ID, entry function, task priority, task context and associated stack point. The VM tasks may be executed according to the corresponding stored scheduling information for each of the VM tasks.

The device physical memory 420 may comprise suitable logic, interfaces and/or code that may be operable to store OS resources such as OS codes and OS data. The OS resources in the device physical memory 420 may be accessed via pointers or memory addresses, which may be related to VM ID information. Each of the VM tasks may have an access to the OS resources based on a corresponding VM ID. The OS resources in the device physical memory 420 may be shared among each of the VM tasks of different VMs in the VMF 330. The device physical memory 420 may comprise a plurality of random access memory (RAM).

In an exemplary operation, the OS task scheduler 410 may be operable to handle each of the VM tasks associated with each of the different VMs such as the VM 340 and the VM 350 in the VMF 330. The usage of OS resources such as OS codes and OS data stored in the device physical memory 420 may be managed to support VM tasks of VM 340 and the VM 350, respectively. The VM ID or corresponding VM ID information may be embedded in global variables and/or static variables that may be utilized to access the OS resources in the device physical memory 420. In this regard, each of the VM tasks may be mapped to specific OS resource spaces of the device physical memory 220b based on corresponding VM IDs. The OS task scheduler 410 may be operable to communicate with the OS 206d to run a VM task utilizing OS resources located in an OS resource space indicated by a corresponding VM ID. In instances where VM tasks for different VMs are mapped to the same OS resource space in the device physical memory 420, the OS resources in the same OS resource space may be re-used to run each of the VM tasks of the different VMs without duplicating the OS resources. To arbitrate conflicts in OS resource contention, VM tasks may be scheduled based on VM task priorities. Resulting VM task scheduling information may be utilized by the OS 206d to execute each of the VM tasks, accordingly.

Figure 5:
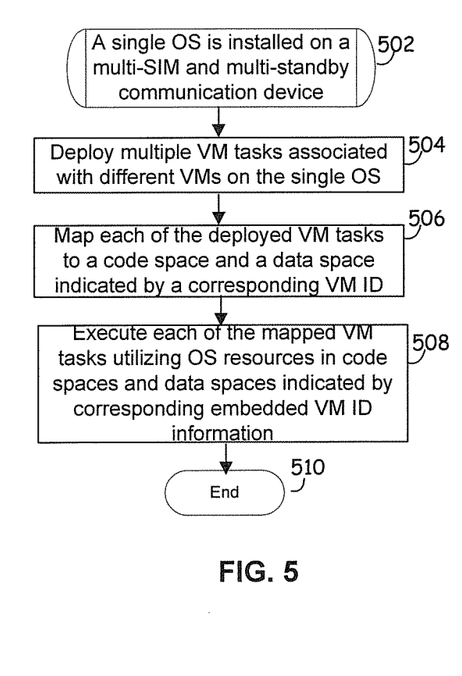
FIG. 5 is a flow chart illustrating exemplary steps that may be performed by an operating system scheduler to map virtual modem related tasks to specific OS resource spaces based on corresponding virtual modem identifiers, in accordance with an embodiment of the invention.

FIG. 5 is a flow chart illustrating exemplary steps that may be performed by an operating system scheduler to map virtual modem related tasks to specific OS resource spaces based on corresponding virtual modem identifiers, in accordance with an embodiment of the invention. Referring to FIG. 5, the exemplary steps may start with step 502. In step 502, a single OS such as the OS 206*d* is installed on the multi-SIM and multi-standby communication device 200. In step 504, the VMF 330 may be operable to deploy multiple VM tasks associated with each of the different VMs such as the VM 340 and the VM 350 on the single OS, namely, the OS 206*d*. In step 506, the OS 206*d* may be operable to embed VM ID information in global and/or static variables that are utilized in the OS 206*d* to access OS resources stored in the device physical memory 420. Each of the deployed VM tasks may be mapped to an OS resource space indicated by corresponding embedded VM ID information. In step 508, the OS 206*d* may execute or run each of the VM tasks utilizing OS resources in OS resource spaces indicated by corresponding embedded VM ID information. The exemplary steps may end in step 510.

Figure 6:
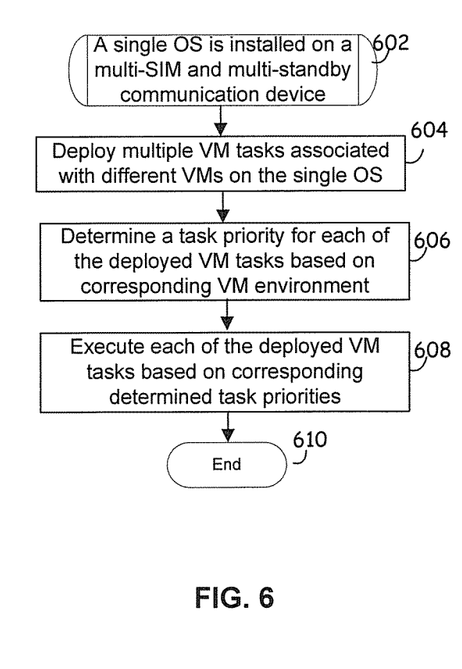
FIG. 6 is a flow chart illustrating exemplary steps that may be performed by an operating system scheduler to execute virtual modem related tasks based on corresponding task priorities, in accordance with an embodiment of the invention.

FIG. 6 is a flow chart illustrating exemplary steps that may be performed by an operating system scheduler to execute virtual modem related tasks based on corresponding task priorities, in accordance with an embodiment of the invention. Referring to FIG. 6, the exemplary steps may start with step 602. In step 602, a single OS such as the OS 206*d* is installed on the multi-SIM and multi-standby communication device 200. In step 604, the VMF 330 may be operable to deploy multiple VM tasks associated with each of the different VMs such as the VM 340 and the VM 350 on the OS 206*d*. In step 606, the OS 206*d* may be operable to embed VM ID and/or VM ID information in global and/or static variables that are utilized in the OS 206*d* to access OS resources stored in the device physical memory 420. Each of the deployed VM tasks may be mapped to an OS resource space indicated by corresponding embedded VM ID information. In step 608, the OS task scheduler 410 may be operable to determine a task priority for each of the deployed VM tasks based on corresponding VM environment such as a VM state and/or tack text. In step 612, the OS 206*d* may execute or run each of the VM tasks based on corresponding determined task priorities.

In various exemplary aspects of the method and system for task scheduling in an operating system for virtual modems within a multi-SIM multi-standby communication device, a multi-SIM and multi-standby communication device such as the multi-SIM multi-standby communication device 200 comprises a single radio resource unit such as the single radio resource unit 370. The single radio resource unit 370 is shared by a plurality of VMs such as the VM 340 and the VM 350 in the VMA 112*c*. The VMF 330 is deployed over the single radio resource unit 370. Each VM is uniquely associated with a single one of a plurality of SIM cards such as the SIM cards 212-222 that are coupled to the multi-SIM multi-standby communication device 200 through the SIM card controller 208. The multi-SIM multi-standby communication device 200 may be operable to concurrently handle traffic related to each of the SIM cards 212-222 utilizing a corresponding one of VMs in the VMF 330. For example, the VM 340 and the VM 350 may be responsible to handle traffic related to the SIM card 212 and the SIM card 214, respectively. As described with regard to FIG. 1-FIG. 6, a single OS such as the OS 206*d* may be installed on the multi-SIM multi-standby communication device 200 to run programs for procedures and/or activities related to VMs such as the VM 340 and the VM 350 in the VMF 330.

The OS task scheduler 410 may be operable to handle VM tasks associated with the VM 340 and the VM 350 in the VMF 330 by sharing OS resources stored in the device physical memory 420. The OS task scheduler 410 may be operable to map VM tasks of each of the VM 340 and the VM 350 to specific OS resource spaces, namely, code spaces and data spaces, of the single OS, namely, the OS 206*d*, based on corresponding VM IDs. The OS 206*d* may be operable to run each of the mapped VM tasks utilizing OS resources located in the OS resource spaces within the device physical memory 420. VM ID information may be embedded in global variables and/or static variables that may be utilized in the OS 206*d* to access the OS resources in the device physical memory 420. An OS resource space for each of the mapped VM tasks may be identified or allocated through its own copy of global and static variables. Each of the mapped VM tasks may be run or executed on the OS 206*d* utilizing OS resources located in corresponding OS resource spaces. In instances where VM tasks of different VMs are mapped to a same OS resource space in the device physical memory 420, OS resources located in the same OS resource space may be re-used or re-run for each of the mapped VM tasks, respectively, without duplicating the OS resources. For example, the same OS resource space may be mapped into different physical memory based on corresponding VM ID to ensure legacy software compatible with multiple VMs. In this regard, the legacy software may be utilized over the same OS resource space for the different VMs without interfering with one to another. To arbitrate conflicts in OS resource contention, the OS task scheduler 410 may be operable to determine a task priority for each of the mapped VM tasks based on corresponding VM environment such as information on a VM state and/or task context. Resulting VM task scheduling information may be stored and utilized by the OS 206*d* to execute each of the mapped VM tasks, accordingly.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for task scheduling in an operating system for virtual modems within a multi-SIM multi-standby communication device.

Accordingly, the present invention may be realized in hardware, software, or a combination of hardware and software. The present invention may be realized in a centralized fashion in at least one computer system, or in a distributed fashion where different computer elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication using a multiple-subscriber identity module (multi-SIM) multi-standby communication device including an operating system (OS) and a radio resource unit that is shared by a plurality of virtual modems, the method comprising:
    embedding corresponding virtual modem identifiers in static variables and global variables;
    mapping tasks for said plurality of virtual modems to OS resource spaces of said OS based on said embedded corresponding virtual modem identifiers, said static variables and said global variables being utilized by said OS to access OS resources in said OS resource spaces;
    determining a task priority for one or more of said mapped tasks of said plurality of virtual modems based on corresponding virtual modem environment information wherein said virtual modem environment information comprises information on a virtual modem state or task context; and
    running said mapped tasks on said OS utilizing said OS resources in said OS resource spaces based on said determined task priority.

2. The method according to claim 1, comprising:
    allocating said OS resource spaces for said mapped tasks based on said corresponding virtual modem identifiers.

3. The method according to claim 2, comprising:
    running one or more of said mapped tasks on said OS utilizing one or more of said OS resources that are in said allocated OS resource spaces.

4. The method according to claim 2, comprising:
    running one or more of said mapped tasks on said OS utilizing OS resources, in a same one of said allocated OS resource spaces, without duplicating said OS resources.

5. The method according to claim 1, comprising:
    scheduling one or more of said tasks based on said determined task priorities.

6. The method according to claim 5, comprising:
    storing corresponding task scheduling it formation for one or more of said tasks.

7. The method according to claim 6, comprising:
    running one or more of said tasks on said OS based on said corresponding stored task scheduling information.

8. A system for communication, the system comprising:
    one or more processors and/or circuits for use in a multiple-subscriber identity module (multi-SIM) multi-standby communication device comprising an operating system (OS) and a radio resource unit that is shared by a plurality of virtual modems, said one or more processors and/or circuits being configured to:
        embed corresponding virtual modem identifiers in static variables, and global variables;
        map tasks for said plurality of virtual modems to OS resource spaces of said OS based on said embedded corresponding virtual modem identifiers, said static variables and said global variables being utilized by said OS to access OS resources in said OS resource spaces;
        determine a task priority for one or more of said mapped tasks of said plurality of virtual modems based on corresponding virtual modem environment information, wherein said virtual modem environment information comprises information on a virtual modem state or task context and
        run said mapped tasks on said OS utilizing said OS resources in said OS resource spaces based on said determined task priority.

9. The system according to claim 8, wherein said one or more processors and/or circuits are configured to:
    allocate said OS resource spaces for said mapped tasks based on said corresponding virtual modem identifiers.

10. The system according to claim 9, wherein said one or more processors and/or circuits are configured to:
    run one or more of said mapped tasks on said OS utilizing one or more of said OS resources that are in said allocated OS resource spaces.

11. The system according to claim 9, wherein said one or more processors and/or circuits are configured to:
    run one or more of said mapped tasks on said OS utilizing OS resources in a same one of said allocated OS resource spaces without duplicating said OS resources.

12. The system according to claim 8, wherein said one or more processors and/or circuits are configured to:
    schedule one or more of said tasks based on said determined task priorities.

13. The system according to claim 12, wherein said one or more processors and/or circuits are configured to:
    store corresponding task scheduling information for one or more of said tasks.

14. The system according to claim 13, wherein said one or more processors and/or circuits are configured to:
    run one or more of said tasks on said OS based on said corresponding stored task scheduling information.

15. A communication device, comprising:
    a radio resource unit configured to communicate with a communication network utilizing a virtual modem; and
    a processor communicatively coupled to said radio resource unit, the processor being configured to:
        embed a corresponding virtual modem identifier in a global variable;
        map a task of said virtual modem to an operating system resource space of an operating system based on said corresponding virtual modem identifier, said global variable being utilized by said operating system to access said operating system resource;
        determine a task priority for said mapped task of said virtual modem based on corresponding virtual modem environment information wherein said virtual modem environment information comprises information on a virtual modem state or task context; and
        run said mapped task on said operating system utilizing said operating system resource in said operating resource space based on said determined task priority.

16. The device according to claim 15, wherein said processor is further configured to:
    embed said corresponding virtual modem identifier in a static variable, said global variable and said static variable being utilized in said operating system to access said operating system resource.

* * * * *

UNITED STATES PATENT AND TRADEMARK OFFICE
CERTIFICATE OF CORRECTION

| | | |
|---|---|---|
| PATENT NO. | : 9,072,035 B2 | Page 1 of 1 |
| APPLICATION NO. | : 12/821673 | |
| DATED | : June 30, 2015 | |
| INVENTOR(S) | : Gong et al. | |

It is certified that error appears in the above-identified patent and that said Letters Patent is hereby corrected as shown below:

Title Page

Item 57, Line 7. Please replace "IDs. which may" with --IDs, which may--.

In the Claims

Column 17, Line 23. Please replace "information wherein" with --information, wherein--.

Column 17, Line 59. Please replace "static variables, and" with --static variables and--.

Column 18, Line 6. Please replace "task context and" with --task context; and--.

Column 18, Line 52. Please replace "information wherein" with --information, wherein--.

Signed and Sealed this
Twenty-sixth Day of April, 2016

Michelle K. Lee
*Director of the United States Patent and Trademark Office*